United States Patent [19]

Field et al.

[11] Patent Number: 4,967,064

[45] Date of Patent: Oct. 30, 1990

[54] METHOD AND APPARATUS FOR A TARGET DETERMINING APPARATUS HAVING INCREASED RANGE

[75] Inventors: Bruce F. Field, Minneapolis; Paul C. Hunt, Brainerd, both of Minn.

[73] Assignee: Tennant Company, Minneapolis, Minn.

[21] Appl. No.: 374,478

[22] Filed: Jun. 30, 1989

[51] Int. Cl.[5] .............................................. G01J 1/20
[52] U.S. Cl. .................................. 250/203.2; 180/169
[58] Field of Search ................... 250/221, 561, 203 R, 250/203.2; 356/1, 5, 141, 152; 901/47

[56] References Cited

U.S. PATENT DOCUMENTS

| | | |
|---|---|---|
| 4,647,784 | 3/1987 | Stephens . |
| 4,687,325 | 8/1987 | Corby, Jr. .............................. 356/2 |
| 4,788,441 | 11/1988 | Laskowski . |
| 4,815,840 | 3/1989 | Benayad-Cherif et al. ......... 250/561 |

OTHER PUBLICATIONS

Gala (tm) Laser Operating Instructions.
Chumbley, Philip E., "Microlasers Offer New Reliability for R&D", Research & Development, Jun. 1989, pp. 72–75.

*Primary Examiner*—David C. Nelms
*Attorney, Agent, or Firm*—Kinzer, Plyer, Dorn, McEachran & Jambor

[57] ABSTRACT

This invention concerns a target determining apparatus that has particular application to a navigation system for an automated guided vehicle. The target determining apparatus has a laser diode light source which is scanned toward retroreflective targets. A photoreceptor in the apparatus detects reflected light returning from a target. The light source is modulated at either a constant or binary-coded frequency. Signals from the photoreceptor are demodulated in accordance with the chosen modulation scheme, resulting in a markedly improved signal-to-noise ratio. This permits either increased amplification of the signal or a reduced threshold for determining a valid target signal. In either case, the range of the apparatus is increased, without increasing the power of the light source, because weaker signals from more distant targets can be reliably distinguished from background noise. The power of the light source may be reduced if desired to limit the range of the apparatus in instances where more than one target might otherwise be within range.

48 Claims, 3 Drawing Sheets

METHOD AND APPARATUS FOR A TARGET DETERMINING APPARATUS HAVING INCREASED RANGE

BACKGROUND OF THE INVENTION

This invention relates generally to a method and apparatus for determining a target. The invention has particular application in a navigation system which determines the range and/or angle to targets placed so as to define the desired path of an automated guided vehicle (AGV). The navigation system steers the vehicle to maintain it on a desired course, based on the detected range/angle information. The automated guided vehicle may, of course, serve any purpose. A machine for treating floor surfaces, such as a sweeper, scrubber or the like, is one example.

Devices for determining the range and angle of a target include the variety using a laser light source sweeping across a retroreflective target. Laskowski U.S. Pat. No. 4,788,441 and Stephens U.S. Pat. No. 4,647,784 show such devices incorporated in AGV's. Field U.S. Pat. Nos. 4,790,402 and 4,876,444 both assigned to the present assignee, illustrate the application of laser guidance to a floor treating machine. The disclosures of the Field patents are incorporated herein by reference.

It is desirable in a laser guidance system for AGV's to maximize the range at which the system can detect a target. This permits maximum flexibility in the placement of targets and reduces the total number of targets needed to define a given path. Maximum range is of particular importance in the floor treatment field. Floor treating machines must perform a task sometimes referred to as region filling. Region filling is where multiple passes of a machine are required to cover a floor area which is wide compared to the machine, e.g., a gymnasium. This task is simplified if the machine can make multiple passes guided by a minimum number of lines or rows of targets, ideally only a single line of targets. Each pass is made with a varying amount of offset from the line of targets. Greater sensor range increases the amount of offset, and consequently the amount of region filling, that can be obtained from a single line of targets.

Perhaps the most straightforward approach to increased range is to increase the power of the laser light source. However, safety considerations limit the power of any laser used to determine a target. The limits on power are dictated by present safety standards. Thus, the maximum range has already been reached with heretofore commercially available laser sources operating within the applicable power standard. Limits on range stem from the difficulty of distinguishing between valid signals generated by light reflected from targets and noise generated by ambient light. The farther away a target is, naturally, the weaker its reflected light signal is. The range limit is reached when a reflected light signal can no longer be reliably distinguished from noise.

Commercially available target determining systems have included gas-filled laser sources, such as a helium-neon laser. The gas-filled device does not permit effective encoding of its light output. However, there are now available semiconductor light sources, such as gallium arsenide laser diodes, which do permit additional encoding to be impressed on the emitted light. This encoding can be used to aid in distinguishing between weaker reflected light signals from distant targets and noise from ambient light. Specifically, a laser diode can be modulated and demodulated at a high frequency to exclude spurious signals, whereas this capability does not exist with a helium-neon laser. Stephens U.S. Pat. No. 4,647,784 suggests using a modulated laser diode in conjunction with a phase shift comparison. The present invention involves a different approach.

SUMMARY OF THE INVENTION

The present invention is directed to a target determining apparatus and method, and is particularly concerned with the application of such an apparatus to an automatically guided floor treating machine.

A primary object of the invention is a target determining apparatus having increased range.

Another object of the invention is a target determining apparatus which can emit light signals of variable intensity.

Another object of the invention is a target determining apparatus which can emit light signals having binary encoding in the signals.

Yet another object of the invention is a target determining apparatus having a light source of reduced physical size, thereby simplifying the housing and optics of the apparatus. This allows the use of fewer mirrors which increases efficiency and makes alignment of the apparatus simpler. Fiber optics could be used to transmit the light to the desired location.

Still another object of the invention is a target determining apparatus having a light source of increased efficiency, thus requiring less input power and producing less heat.

A further object of the invention is a target determining apparatus having a light source which affords increased life, reduced maintenance and reduced cost.

An additional object of the invention is a target determining apparatus having a light source which is not visible to the human eye.

The target determining apparatus includes a laser diode mounted on the machine at a first location. The output of the laser diode is modulated, either at a constant or binary-coded frequency. A plurality of retroreflective targets are placed at locations defining the desired path of the machine. The modulated output of the laser diode is aimed at one of the targets, with continuous updating of the aiming as the vehicle moves, as taught in the Field U.S. Pat. No. 4,790,402. A photoreceptor at the first location senses light reflected from a target. The signal from the photosensor is then demodulated and amplified, in either order. The demodulation is in accordance with the constant or binary-coded frequency of the modulation.

The present invention achieves increased range of a laser-based target determining apparatus by modulating a laser diode, demodulating the signal coming from a photoreceptor and either increasing the amplification or decreasing the threshold for defining a valid signal, as compared to the standards for gas-filled lasers.

In the case of increased amplification, weaker signals from farther targets will be amplified sufficiently to meet an existing threshold for defining a valid target. The accompanying noise is so reduced by the demodulating that even though the noise is also subject to increased amplification, it will not meet the threshold. In the case of decreasing the threshold for defining a valid signal, weaker signals from farther targets will meet the new, reduced threshold and will be recognized as valid targets. The noise, as mentioned, is sufficiently reduced by demodulating that it will not meet even the reduced threshold and will not interfere with recognition of far away targets. Stated differently, for a given acceptable signal-to-noise ratio, the target determining apparatus of the present invention will recognize as valid targets which are about twice as far away as the maximum detectable with gas-filled lasers.

The present invention also contemplates varying the power of the laser diode in certain situations where it is desirable to limit the range of the target determining apparatus. Such situations arise in the operation of a floor treating machine. When such a machine is turning a corner the laser guidance is temporarily disabled. See Field U.S. Pat. No. 4,790,402. Upon completion of the turn, control of vehicle steering is returned to the laser system. During the turn the laser is "looking" for its next target and it may lock onto the closest target coming out of the turn or it may lock onto a farther one. From the standpoint of achieving the most rapid steering correction to the desired path (if one is necessary), it is preferable to have the laser lock onto the closest target. With the present invention, it is possible to temporarily reduce the laser's range so that it will not "see" the farther target and therefore it will continue to look until it finds the closest target.

DETAILED DESCRIPTION OF THE INVENTION

Figure 1:
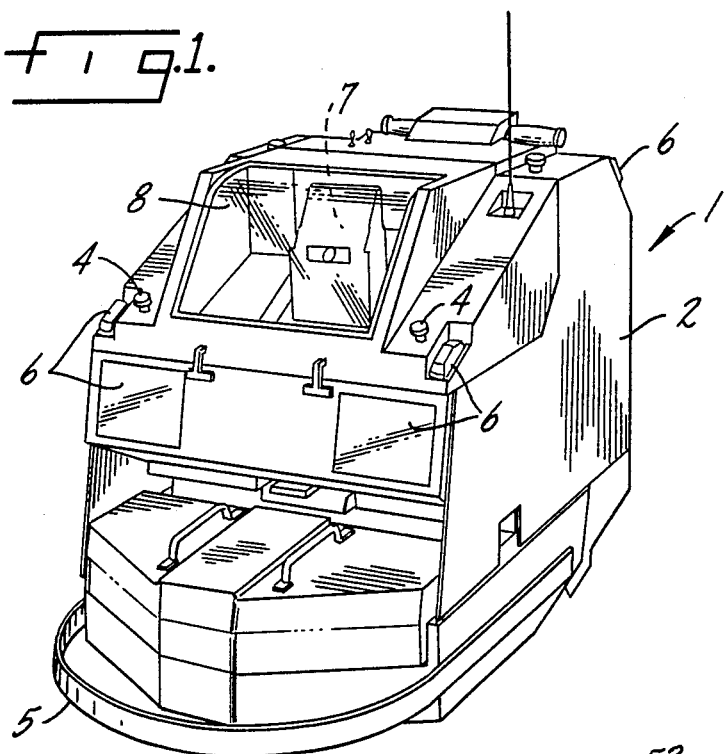
FIG. 1 is a perspective view of a floor treating machine equipped with the target determining apparatus of the present invention.

FIG. 1 illustrates a floor treating machine, such as a sweeper, which incorporates the target determining apparatus of the present invention. The sweeper 1 has a body 2 mounted on a frame which is movable on wheels. The frame mounts the usual power source for propelling the vehicle and for operating the brush and related sweeping mechanisms. These parts are inside the vehicle body and are not shown, as they form no part of the present invention. The exterior of the sweeper is outfitted with several safety devices, including shut-off switches 4, bump switch 5 and lights 6. The target determining apparatus or laser unit 7 is shown underneath a clear cover or hood 8. Reference is made to the patents cited above for further details of the sweeper and of the physical arrangement of the laser unit 7.

Figure 2:
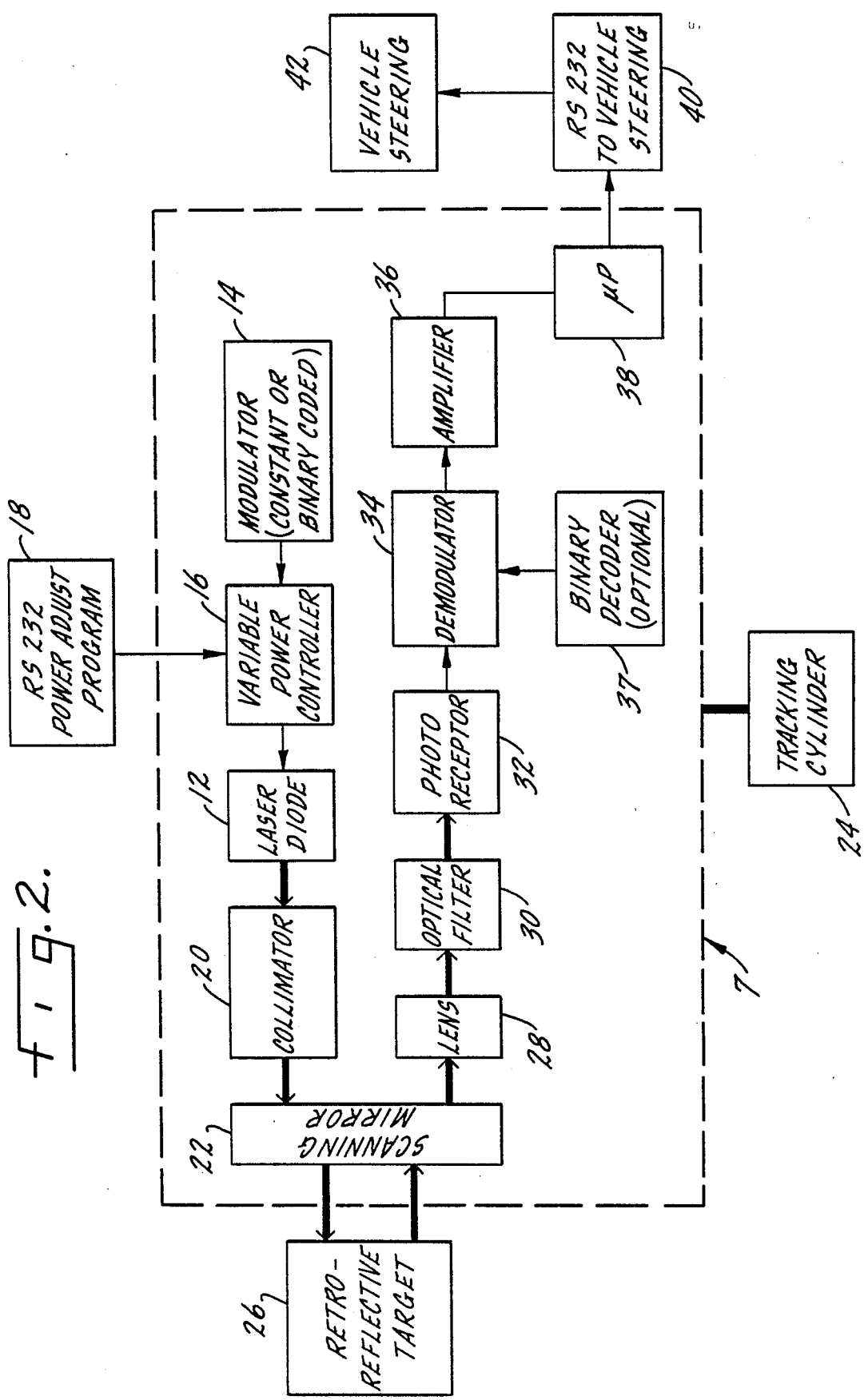
FIG. 2 is a block diagram of the target determining apparatus of the present invention.

The electronics of the target determining apparatus are illustrated in block diagram form in FIG. 2. The laser unit 7 is shown within the dotted boundary. It includes a semiconductor light source, preferably a laser diode 12 having a power output which qualifies the unit as a Class II laser device under the standards set by the U.S. Center for Devices and Radiological Health. The Class II standard limits the output of the laser unit to less than one milliwatt. It will be understood that the diode itself may have a higher power but internal attenuation and sweeping of the beam reduce the perceived power at the exterior of the unit.

The output of the laser diode is pulsed or chopped by a modulator 14 at a very high frequency, on the order of 10 MHz. The modulator can operate either at a constant rate or in a binary-coded fashion, which will be further described below.

In the illustrated embodiment, the output of the modulator is supplied to a variable power controller 16. The power controller 16 is capable of reducing the intensity of the light emitted by the laser diode 12. The power reduction is controlled by a power adjust program 18 received through an RS232 port from the computer control for the vehicle. The power adjust program 18 and variable power controller 16 allow selective reduction of the range of the laser unit. The advantage of this will be explained below. The use of the variable power controller 16 is optional. The increased range of the target determining apparatus can be obtained without the power controller, i.e., with the modulator 14 controlling the laser diode 12 directly.

The modulated light from the laser diode 12 is passed through a collimator 20 and then to a rotating scanning mirror 22. The scanning mirror rotates the light beam from collimator 20 in a plane, through a 360° sweep. An aperture in the laser unit 7 permits 90° of that sweep out of the unit. A tracking cylinder 24 controls the angle of elevation of the scanning plane. The combination of the beam scanning and the elevation adjustment directs the light beam from the laser diode to one of a plurality of retroreflective targets 26. Together the scanning mirror 22 and tracking cylinder 24 form an aiming means which train a light beam onto a target. Details of this function are described in Field U.S. Pat. No. 4,790,402. It will be understood that in the case of floor treating machines, there will be a plurality of targets arranged along the desired path of the vehicle.

Light reflected from the target 26 is returned to the scanning mirror 22, which directs it to a lens 28. The lens 28 focuses the reflected light, which then passes through an optical filter 30 and strikes a photoreceptor 32. The photoreceptor is typically a phototransistor.

The electrical signal from the photoreceptor is supplied to a demodulator 34 which is driven at the same frequency as the modulator 14. If binary coding is used, a binary decoder 37 supplies the appropriate code to the demodulator 34 so that it can recognize and pass those signals which correspond to the modulated pattern of signals. Signals passed by the demodulator are amplified by an amplifier 36. The positions in the circuit of the amplifier and demodulator could be reversed from that shown. In other words, the amplifier could amplify the signal from the photoreceptor 32 prior to demodulating. In any case, the signal is then supplied to a microprocessor 38 which is programmed to recognize the distance and angle to the target, as shown in the Laskowski patent. The angle and distance information is supplied to an RS232 port 40 and from there to the vehicle steering control illustrated at 42. The steering control steers the vehicle to maintain the desired course in accordance with the range and angle information.

Figure 3:
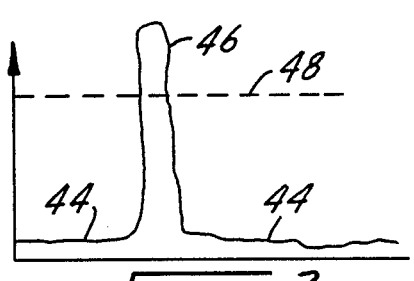
FIG. 3 is a graph of the photoreceptor's output from a relatively close target in the device of the present invention.

The signal supplied to the microprocessor 38 by the circuit of FIG. 2 is shown in FIG. 3. The signal includes noise 44 caused by ambient light and a peak 46 caused by the recognition of a valid target. It will be noted that the peak exceeds a threshold 48 which is defined by the microprocessor 38. When the peak of a signal exceeds the threshold 48 (and has a width appropriate to the target width being used), it is considered to be a valid target and the microprocessor outputs it accordingly.

Figure 4:
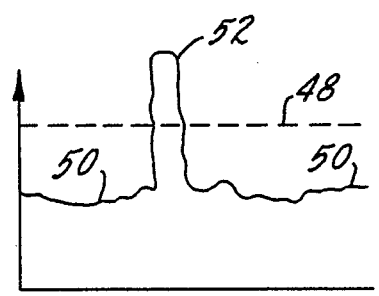
FIG. 4 is a graph of the photoreceptor's output from a relatively close target in a prior art device having a gas-filled laser source.

FIG. 4 illustrates a corresponding signal from a prior art device, i.e., one having a gas-filled laser source with no modulation. This signal has noise components 50 and a peak 52. Comparing FIGS. 3 and 4, it will be noted that for a target at the same distance the peaks 46 and 52 are the same. However, the noise 50 exceeds that of the noise signals 44 in the present invention. This becomes important when the distance to the targets increases, as illustrated in FIGS. 5 and 6.

Figure 5:
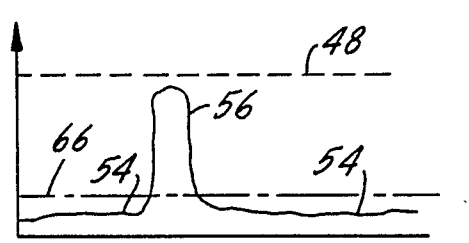
FIG. 5 is a graph of the photoreceptor's output from a relatively far target in the device of the present invention.
Figure 7:
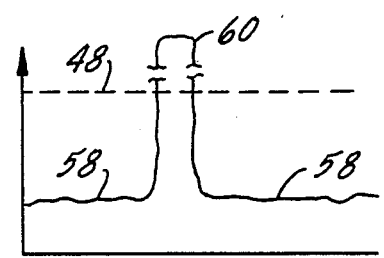
FIG. 7 is a graph of the amplified photoreceptor output of FIG. 5, according to one embodiment of the present invention.
Figure 6:
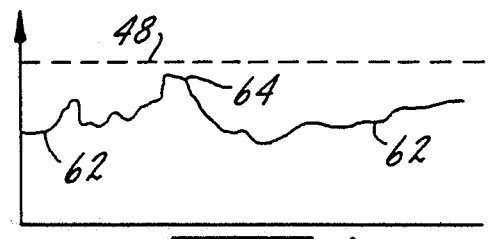
FIG. 6 is a graph of the photoreceptor's output from a relatively far target in a prior art device having a gas-filled laser source.

FIG. 5 illustrates the demodulated signal from a relatively remote target. The signal has noise components 54 and a peak 56. Because the target is farther away, the height of the peak is lower than for closer targets. It will be noted that the peak 56 is below the existing threshold 48 for indicating a valid target. However, the amplifier 36 can increase the amplitude of the signal in FIG. 5, resulting in a signal as in FIG. 7. The amplified signal has noise components 58 and a peak 60. The peak 60 exceeds the threshold 48 and will be output as a valid target. The noise 58, even though amplified, will not meet the threshold 48 and will be ignored. This contrasts with the situation shown in FIG. 6 for the prior art gas-filled laser. Its signal has noise components 62 and a peak 64. The peak 64 does not meet the threshold 48, so it will not be recognized as a valid target. Further, if it were attempted to amplify the signal of FIG. 6 to bring the peak 64 above the threshold, the noise 62 would also be raised above the threshold. It would be impossible to reliably distinguish between noise and peaks. It is only the reduced noise afforded by modulating and demodulating that permits greater amplification, thereby allowing far away target peaks to be distinguished from noise.

It will be understood that gas-filled laser units do amplify signals from the photoreceptor a limited amount. The present invention contemplates increasing this amplification beyond that acceptable in prior art devices. For example, the commercially-available device sold under the trademark Lasernet by Namco Controls of Mentor, Ohio (model LN120-30000 for example), has a gas-filled laser source. It sets a threshold of 0.6 volts (when six-inch wide targets are used) and amplifies the photoreceptor signal such that a target at 10 feet produces a 1 volt peak and a target at 31 feet produces a 0.7 volt peak. This level of amplification produces a maximum range of about 31–32 feet. In the present invention, this existing amplification is increased by a factor of three, although it could be otherwise. The increased amplification of applicant's device provides a maximum range of about 65 feet. These figures would, of course, change for different target widths or different phototransistor sensitivities. Alternatively, the threshold could be reduced by one-third to about 0.2 volts, as will now be explained.

FIG. 5 illustrates an alternate method of increasing the range of the apparatus. There, instead of adding additional amplification, the threshold is reduced to a new lower threshold 66. Even the lesser peak 56 from a far away target can meet the reduced threshold 66. At the same time, the noise 54 is low enough that it will not meet the threshold and will not confuse the recognition circuitry in the microprocessor 38. Reducing the threshold is considered preferable to additional amplification, although either technique will work.

Figure 8:
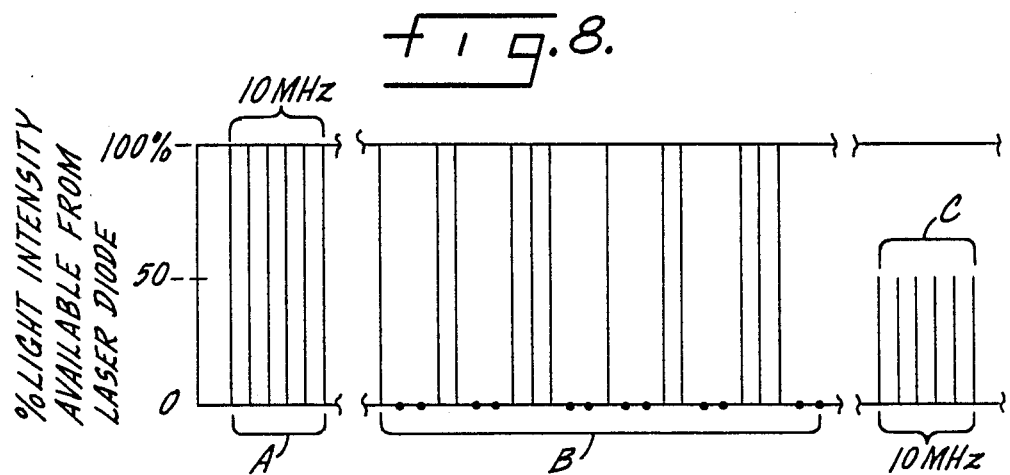
FIG. 8 is a chart illustrating possible modulating methods and a power reduction method of the present invention.

FIG. 8 illustrates possible modulating schemes. At A, a constant 10 MHz frequency modulation is applied to the laser diode. At the portion of FIG. 8 indicated at B, a binary-coded frequency is indicated. This is a pattern of on and off pulsing of the laser diode. A typical pattern is shown, although it will be understood that the possibilities are numerous for binary-encoding schemes. The demodulator 34 is supplied with a similar pattern from the binary decoder 36 such that signals are passed only if they correspond to the binary coding impressed on the laser diode. This scheme of operation further reduces the noise. Binary encoding would allow multiple machines to operate in the same vicinity and not become confused by each other's signals. Each machine would have a different binary encoding, which would be recognized only by its own sensing devices.

FIG. 8 also illustrates the possibility of reducing the power of the laser diode. This is at portion C of FIG. 8 where the modulated light (either at a constant or binary-coded frequency) is reduced to only, say, fifty percent of its available power. This induces a shortening of the range of the laser unit.

Figure 9:
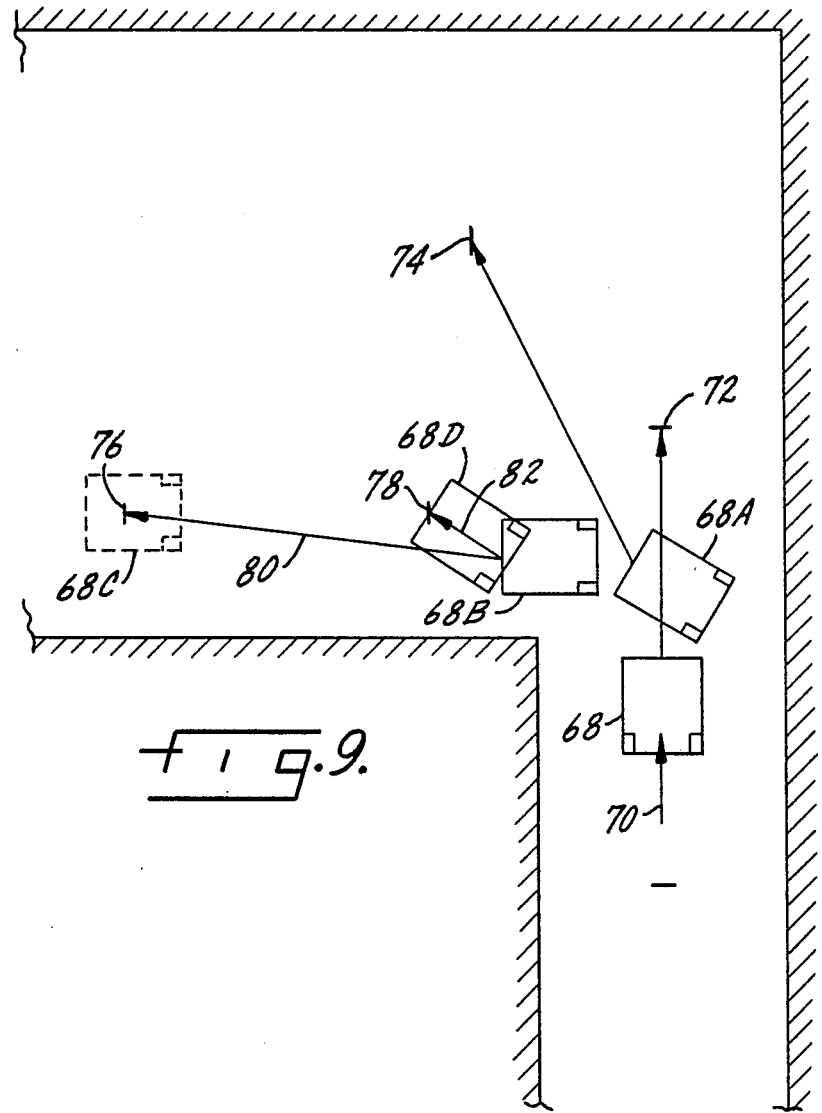
FIG. 9 is a diagram illustrating a floor maintenance machine turning a corner.

There may be instances where it is desirable not to permit the laser unit to "see" far away targets. FIG. 9 illustrates one such instance which may occur during operation of floor treating machines. There a machine 68 is moving in the direction of arrow 70 while guiding to a target 72. The desired path of the vehicle may require a turn, as shown by the vehicle at a subsequent position 68A. As described in Field U.S. Pat. No. 4,790,402, when the vehicle turns, its steering control is temporarily taken away from the laser unit and given to a special turning control. During this time, the laser unit continues to search for the next target that it will use upon regaining steering control. When it finds a target, it will lock onto it and steer toward it upon resumption of laser unit steering. As shown in FIG. 9, during the course of the turn the laser may "see" targets at 74, 76 or 78. From the standpoint of earliest correction to the desired path (if a correction is needed), it is preferable that the vehicle lock onto the closest target 78. Suppose the vehicle comes out of the turn in a position 68B, whereas the desired path would have it in line with targets 76 and 78. If the vehicle has locked onto target 76, it will steer toward that target along the path indicated at 80. The vehicle would eventually return to the desired path at the dotted position shown at 68 C. If instead the vehicle had locked onto target 78, it would steer along the path 82, thus returning to the desired path much sooner than if it follows the path 80. This is illustrated by the machine position 68D.

To assure that target 78, and not 74 or 76, is found as the vehicle is turning, the power adjust program 18 could activate variable power controller 16 to reduce the power to the laser diode by some amount. This would limit the distance at which the laser device could see the targets, so target 74 and 76 simply would not be found as the laser is looking for its next target. Only target 78 would be recognizable by the laser unit in its reduced power mode, so it would be the one steered toward upon resumption of laser control after a turn.

While a preferred form of the invention has been shown and described, it will be understood that modification could be made thereto without departing from the scope of the following claims.

We claim:

1. A target determining apparatus, comprising:
   a semiconductor light source at a first location, the light source having a power rating such that the emitted power of the apparatus is no more than 1 milliwatt;
   means for modulating the light source in a predetermined manner;
   at least one retroreflective target adapted to be at a second location to reflect light from the light source back toward said first location;
   aiming means for directing a light beam from the light source to the target;
   a photoreceptor located at the first location so as to be responsive to reflected light from the target;
   demodulating means for demodulating photoreceptor signals in accordance with said predetermined manner so as to pass only signals having characteristics corresponding to the means for modulating; and
   amplifying means for amplifying the signal from the photoreceptor an amount sufficient to create a peak signal of at least 0.6 volts from light reflected from a six-inch wide target about 65 feet from the first location.

2. The apparatus of claim 1 wherein the amplifying means amplifies the signal from the photoreceptor at least times.3

3. The apparatus of claim 1 wherein the modulating means operates at a constant frequency.

4. The apparatus of claim 3 wherein the modulating means operates at about 10 MHz.

5. The apparatus of claim 1 wherein the modulating means applies a binary coded frequency to the light source and the demodulating means includes a corresponding binary decoder.

6. The apparatus of claim 5 further comprising means for varying the power of the light source.

7. The apparatus of claim 1 further comprising means for varying the power of the light source.

8. The apparatus of claim 1 wherein the light source is a laser diode.

9. A method for determining a target, comprising the steps of:
   placing a semiconductor light source at a first location, the light source having a power rating such that the emitted power of the source is no more than 1 milliwatt;
   modulating the light source in a predetermined manner;
   placing at least one retroreflective target at a second location to reflect light from the light source back toward said first location;
   directing a light beam from the light source to the target;
   sensing light reflected from the target with a photoreceptor located at the first location;
   demodulating signals from the photoreceptor in accordance with said predetermined manner so as to pass only signals having characteristics corresponding to the means for modulating; and
   amplifying the signal from the photoreceptor an amount sufficient to create a peak signal of at least 0.6 volts from light reflected from a six-inch wide target about 65 feet from the first location.

10. The method of claim 9 further characterized in that the signal from the photoreceptor is amplified at least 3 times.

11. The method of claim 9 further characterized by modulating the light source at a constant frequency.

12. The method of claim 11 further characterized by modulating the light source at about 10 MHz.

13. The method of claim 9 wherein the modulating step is characterized by applying a binary coded frequency to the light source and the demodulating step includes a corresponding binary decoding.

14. The method of claim 13 further comprising the step of varying the power of the light source.

15. The method of claim 9 further comprising the step of varying the power of the light source.

16. The method of claim 9 wherein the light source is a laser diode.

17. In a target determining apparatus of the type having a light source at a first location, at least one retroreflective target adapted to be at a second location to reflect light from the light source back toward said first location, aiming means for directing a light beam from the light source to the target, a photoreceptor located at the first location so as to be responsive to light reflected from the target, means for amplifying the output of the photoreceptor and means for establishing criteria for distinguishing between photoreceptor signals generated by reflected light from a target and photoreceptor noise, the improvement comprising a method of increasing the range of the apparatus without increasing the power of the light source, comprising the steps of:
   using a laser diode as the light source;
   modulating the laser diode such that it emits a known pattern of pulses of light;
   demodulating the output of the photoreceptor according to the known pattern of pulses; and
   increasing the gain of the means for amplifying such that weaker signals from farther targets will meet said criteria for distinguishing but the amplified noise will not.

18. The method of claim 17 further characterized by modulating the light source at a constant frequency.

19. The method of claim 18 further characterized by modulating the light source at about 10 MHz.

20. The method of claim 17 wherein the modulating step is characterized by applying a binary coded frequency to the light source and the demodulating step includes a corresponding binary decoding.

21. The method of claim 20 further comprising the step of varying the power of the light source.

22. The method of claim 17 further comprising the step of varying the power of the light source.

23. In a target determining apparatus of the type having a light source at a first location, at least one retroreflective target adapted to be at a second location to reflect light from the light source back toward said first location, aiming means for directing a light beam from the light source to the target, a photoreceptor located at the first location so as to be responsive to light reflected from the target, means for amplifying the output of the photoreceptor and means for establishing criteria for distinguishing between photoreceptor signals generated by reflected light from a target and photoreceptor noise, the improvement comprising a method of increasing the range of the apparatus without increasing the power of the light source, comprising the steps of:
  using a laser diode as the light source;
  modulating the laser diode such that it emits a known pattern of pulses of light;
  demodulating the output of the photoreceptor according to the known pattern of pulses; and
  altering the criteria for distinguishing between photoreceptor signals generated by reflected light from a target and photoreceptor noise such that weaker signals from farther targets will meet said criteria for distinguishing but the noise will not.

24. The method of claim 23 further characterized by modulating the light source at a constant frequency.

25. The method of claim 24 further characterized by modulating the light source at about 10 MHz.

26. The method of claim 23 wherein the modulating step is characterized by applying a binary coded frequency to the light source and the demodulating step includes a corresponding binary decoding.

27. The method of claim 26 further comprising the step of varying the power of the light source.

28. The method of claim 23 further comprising the step of varying the power of the light source.

29. An automated guided vehicle of the type having a navigation system for sensing a desired path and steering means responsive to the navigation system for guiding the vehicle along said path, an improved navigation system, comprising:
  a semiconductor light source at a first location on the vehicle;
  a plurality of retroreflective targets placed along the desired path of the vehicle and adapted to reflect light from the light source back toward said first location;
  aiming means for directing a light beam from the light source to one of the targets;
  a photoreceptor located at the first location so as to be responsive to reflected light from the target;
  sensing means responsive to the photoreceptor for sensing the vehicle's position relative to the desired path and controlling the steering means of the vehicle in response the vehicle's relative position to guide the vehicle along the desired path;
  means for varying the power of the light source; and
  means for controlling said means for varying so as to selectively shorten the range of the navigation system, thereby inducing the aiming means to direct light to a closer target as opposed to a farther target during instances when more than one target might otherwise be within range.

30. The apparatus of claim 29 further comprising means for modulating the light source in a predetermined manner and demodulating means for demodulating photoreceptor signals in accordance with said predetermined manner so as to pass only signals having characteristics corresponding to the means for modulating.

31. The apparatus of claim 30 wherein the modulating means operates at a constant frequency.

32. The apparatus of claim 31 wherein the modulating means operates at about 10 MHz.

33. The apparatus of claim 30 wherein the modulating means applies a binary coded frequency to the light source and the demodulating means includes a corresponding binary decoder.

34. The apparatus of claim 29 wherein the light source is a laser diode.

35. In an automated guided vehicle of the type having a navigation system for sensing a desired path and steering means responsive to the navigation system for guiding the vehicle along said path, an improved method for guiding the vehicle comprising the steps of:
  placing a semiconductor light source at a first location on the vehicle;
  placing a plurality of retroreflective targets along the desired path of the vehicle, the targets being adapted to reflect light from the light source back toward said first location;
  aiming a light beam from the light source to one of the targets;
  sensing light reflected from the target with a photoreceptor located at the first location;
  sensing, in response to the photoreceptor, the vehicle's position relative to the desired path;
  controlling the steering means of the vehicle in response the vehicle's relative position to guide the vehicle along the desired path; and
  controlling the power of the light source so as to selectively shorten the range of the navigation system, thereby inducing the aiming of the light beam to a closer target as opposed to a farther target during instances when more than one target might otherwise be within range.

36. The method of claim 35 further comprising the steps of modulating the light source in a predetermined manner and demodulating signals from the photoreceptor in accordance with said predetermined manner so as to pass only signals having characteristics corresponding to the means for modulating.

37. The method of claim 36 further characterized by modulating the light source at a constant frequency.

38. The method of claim 37 further characterized by modulating the light source at about 10 MHz.

39. The method of claim 36 wherein the modulating step is characterized by applying a binary coded frequency to the light source and the demodulating step includes a corresponding binary decoding.

40. The method of claim 35 wherein the power of the light source is reduced as the vehicle is turning such that upon completion of the turn the light will be aimed at a closer target as opposed to a farther target.

41. In a target determining apparatus of the type having a light source at a first location, at least one retroreflective target at a second location in spaced relation to the first location to reflect light from the light source back toward the first location, a photoreceptor at the first location responsive to light reflected from the target, means for amplifying the output of the photoreceptor, and means for establishing a threshold level between photoreceptor return signals generated by reflected light from a target and photoreceptor noises generated by stray light, the sensitivity of the photoreceptor, the amplification of the means for amplifying and the threshold level being chosen to enable the apparatus to sense reliably a target at a first maximum range from the first location, the improvement comprising a method of increasing the maximum range of the apparatus to a second, maximum range without increasing the power of the light source or the sensitivity of the photoreceptor, comprising the steps of:
  using a laser diode as the light source;

modulating the laser diode such that it emits a known pattern of pulses of light;

demodulating the output of the photoreceptor according to the known pattern of pulses; and altering the relation between the threshold level and the return signal such that signals from targets at ranges beyond said first maximum range exceed the threshold, without causing the photoreceptor noise to exceed the threshold level.

42. The method of claim 41 wherein the altering step is characterized by increasing the gain of the means for amplifying such that return signals from targets beyond said first maximum range will meet said threshold level but the amplified noise will not.

43. The method of claim 41 wherein the altering step is characterized by reducing said threshold level such that signals from targets beyond said first maximum range will meet said threshold level but the noise will not.

44. The method of claim 41 further characterized by modulating the light source at a constant frequency.

45. The method of claim 44 further characterized by modulating the light source at about 10 MHz.

46. The method of claim 41 wherein the modulating step is characterized by applying a binary coded frequency to the light source and the demodulating step includes a corresponding binary decoding.

47. The method of claim 46 further comprising the step of varying the power of the light source.

48. The method of claim 41 further comprising the step of varying the power of the light source.

* * * * *